United States Patent
Davis

(10) Patent No.: US 6,203,586 B1
(45) Date of Patent: Mar. 20, 2001

(54) FIRE ENHANCEMENT SYSTEM

(76) Inventor: John W. Davis, 641 Pheasant Run, West Fargo, ND (US) 58078

( * ) Notice: Subject to any disclaimer, the term of this patent is extended or adjusted under 35 U.S.C. 154(b) by 0 days.

(21) Appl. No.: 09/481,989

(22) Filed: Jan. 12, 2000

(51) Int. Cl.$^7$ .................................................. C10L 5/00
(52) U.S. Cl. ................................................ 44/535; 44/530
(58) Field of Search .............................. 44/530, 535, 541

(56) References Cited

U.S. PATENT DOCUMENTS

| | | | |
|---|---|---|---|
| 2,373,512 | * | 4/1945 | Starner ..................................... 102/31 |
| 2,398,571 | * | 4/1946 | Young . |
| 2,863,741 | * | 12/1958 | Sorgi ......................................... 44/519 |
| 3,370,932 | * | 2/1968 | Kelly et al. . |
| 3,637,355 | * | 1/1972 | Brockbank .............................. 44/535 |
| 3,874,365 | * | 4/1975 | Pava ......................................... 44/535 |
| 4,029,550 | * | 6/1977 | Mitsui et al. .......................... 201/2.5 |
| 4,043,765 | * | 8/1977 | Tanner ..................................... 44/535 |
| 4,062,655 | * | 12/1977 | Brockbank . |
| 4,308,032 | * | 12/1981 | Benson .................................... 44/535 |
| 4,309,189 | * | 1/1982 | Oberhardt . |
| 4,997,457 | * | 3/1991 | Mitsusawa .............................. 44/550 |
| 5,524,609 | * | 6/1996 | Krull ........................................ 44/535 |
| 5,573,557 | * | 11/1996 | Thunker et al. ........................ 44/530 |
| 5,681,358 | * | 10/1997 | Spencer et al. ........................ 44/300 |
| 5,695,531 | * | 12/1997 | Makino et al. ......................... 44/530 |
| 5,853,433 | * | 12/1998 | Spencer et al. ........................ 44/300 |
| 5,938,799 | * | 8/1999 | Spencer .................................. 44/300 |

* cited by examiner

Primary Examiner—Margaret Medley
(74) Attorney, Agent, or Firm—Michael S. Neustel

(57) ABSTRACT

A fire enhancement system for increasing the visual appearance of a fire with a simple to utilize structure. The inventive device includes an outer tube defining an interior cavity, and a fuel member positioned within the interior cavity of the outer tube. The outer tube is preferably comprised of copper tubing or similar composition of copper with the fuel member comprised of a plastic material thereby forming a chemical reaction when heated thereby displaying a pleasing variety of colors within a fire. The outer tube may include a first cap and a second cap for preventing the fuel member from exiting the outer tube.

6 Claims, 2 Drawing Sheets

FIRE ENHANCEMENT SYSTEM

BACKGROUND OF THE INVENTION

1. Field of the Invention

The present invention relates generally to fire enhancement products for campfires and fireplaces, and more specifically it relates to a fire enhancement system for increasing the visual appearance of a fire with a simple to utilize structure.

Fires are commonly utilized by individuals to provide warmth and sometimes merely for aesthetic reasons. Wood fires typically display white, red and orange colors within their flames. It is desirable to increase the visual appearance of these fires to provide an increased aesthetic appearance.

2. Description of the Prior Art

Fire enhancement devices have been in use for years. Typically, an "artificial log" is comprised of wood material along with various chemicals to decrease the amount of time to ignite a fire. Some fire enhancement products add a scent to the fire to make the scent of the fire pleasing to individuals adjacent the fire.

Examples of patented fire enhancement devices include U.S. Pat. No. 3,370,932 to Kelly et al.; U.S. Pat. No. 2,398,571 to Young; U.S. Pat. No. 4,309,189 to Oberhardt; U.S. Pat. No. 4,997,457 to Mitsusawa et al.; U.S. Pat. No. 4,062,655 to Brockbank; U.S. Pat. No. 2,373,512 to Starner which are all illustrative of such prior art. The disclosures and content of these patents are hereby incorporated by reference regarding the present patent application.

While these devices may be suitable for the particular purpose to which they address, they are not as suitable for increasing the visual appearance of a fire with a simple to utilize structure. Conventional products on the market do not increase the visual appearance of the fire. Patented inventions do not provide an easy self-contained structure to utilize to increase the visual appearance of the fire.

In these respects, the fire enhancement system according to the present invention substantially departs from the conventional concepts and designs of the prior art, and in so doing provides an apparatus primarily developed for the purpose of increasing the visual appearance of a fire with a simple to utilize structure.

SUMMARY OF THE INVENTION

In view of the foregoing disadvantages inherent in the known types of fire enhancement devices now present in the prior art, the present invention provides a new fire enhancement system construction wherein the same can be utilized for increasing the visual appearance of a fire with a simple to utilize structure.

The general purpose of the present invention, which will be described subsequently in greater detail, is to provide a new fire enhancement system that has many of the advantages of the fire enhancement devices mentioned heretofore and many novel features that result in a new fire enhancement system which is not anticipated, rendered obvious, suggested, or even implied by any of the prior art fire enhancement devices, either alone or in any combination thereof.

To attain this, the present invention generally comprises an outer tube defining an interior cavity, and a fuel member positioned within the interior cavity of the outer tube. The outer tube is preferably comprised of copper tubing or similar composition of copper with the fuel member comprised of a plastic material thereby forming a chemical reaction when heated thereby displaying a pleasing variety of colors within a fire. The outer tube may include a first cap and a second cap for preventing the fuel member from exiting the outer tube.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fire enhancement system that will overcome the shortcomings of the prior art devices.

A second object is to provide a fire enhancement system for increasing the visual appearance of a fire with a simple to utilize structure.

Another object is to provide a fire enhancement system that dramatically increases the total number of colors displayed within a fire.

An additional object is to provide a fire enhancement system that increases the blue and green colors of the fire.

A further object is to provide a fire enhancement system that is self-contained in a convenient structure.

Another object is to provide a fire enhancement system that can be easily manufactured.

A further object is to provide a fire enhancement system that can be utilized upon various types of fires including campfires and fireplaces.

Another object is to provide a fire enhancement system that continuously displays various colors for an extended period of time.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
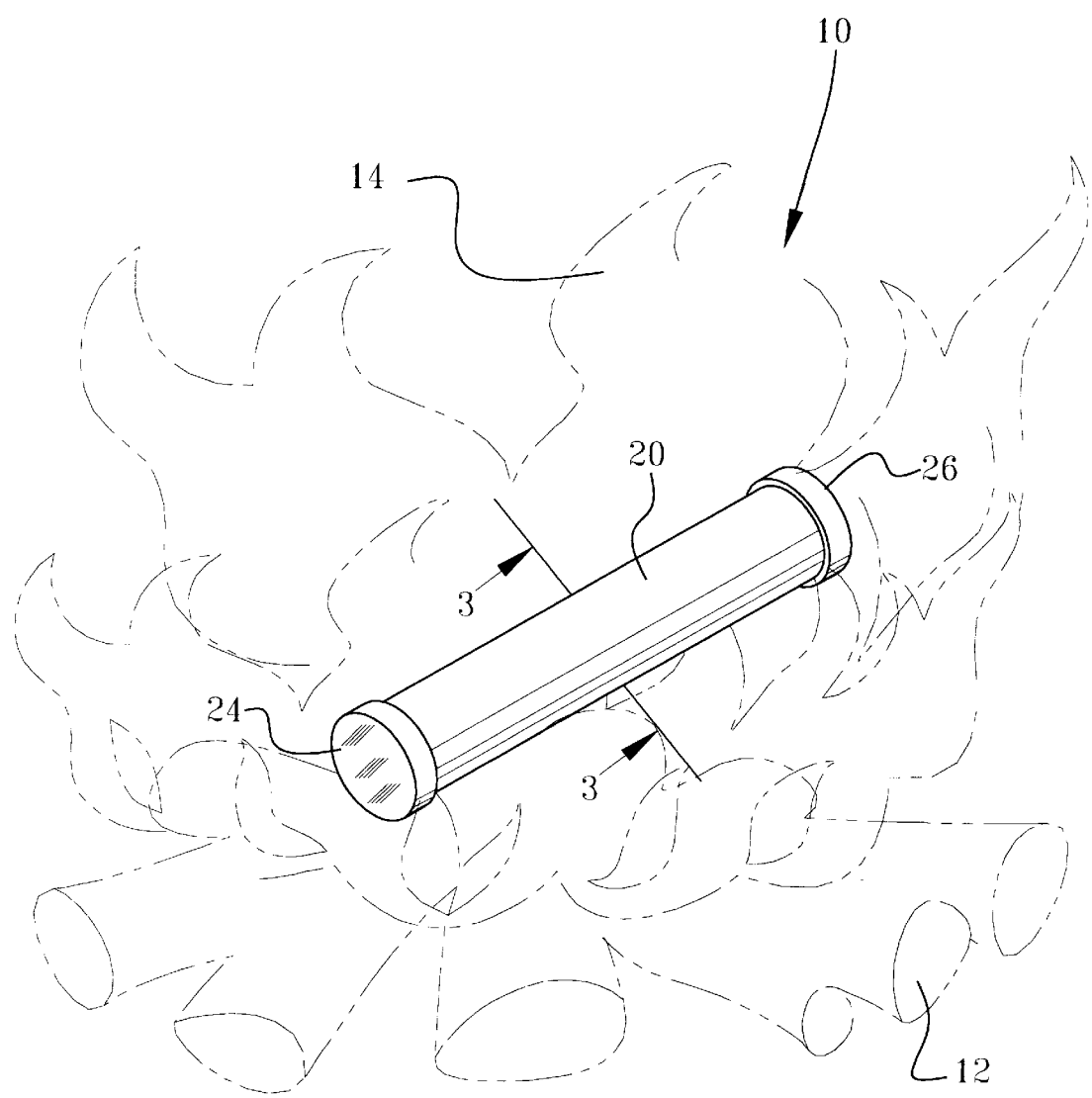
FIG. 1 is an upper perspective view of the present invention positioned within a fire.
Figure 2:
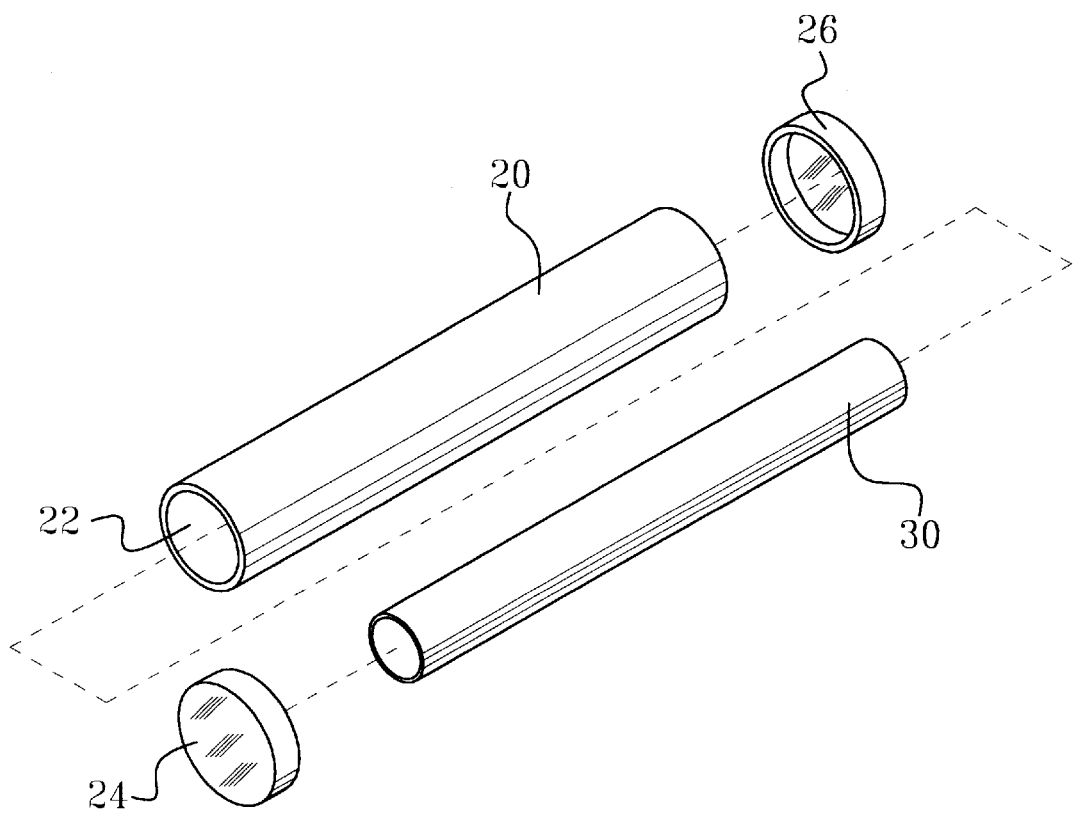
FIG. 2 is an exploded upper perspective view of the present invention.
Figure 3:
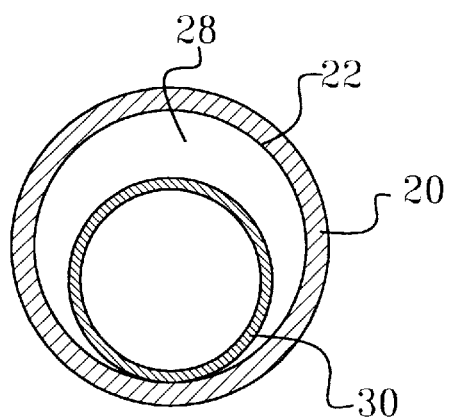
FIG. 3 is a cross sectional view taken along line 3—3 of FIG. 1 of the drawings.

Turning now descriptively to the drawings, in which similar reference characters denote similar elements throughout the several views, FIGS. 1 through 3 illustrate a fire enhancement system 10, which comprises an outer tube 20 defining an interior cavity 28, and a fuel member 30 positioned within the interior cavity 28 of the outer tube 20. The outer tube 20 is preferably comprised of copper tubing or similar composition of copper with the fuel member 30 comprised of a plastic material thereby forming a chemical reaction when heated thereby displaying a pleasing variety of colors within a fire 14. The outer tube 20 may include a first cap 24 and a second cap 26 for preventing the fuel member 30 from exiting the outer tube 20.

As shown in FIGS. 1 and 2 of the drawings, the tube 20 is preferably an elongate structure. As shown in FIGS. 2 and 3 of the drawings, the tube 20 has a lumen 22 defining an inner cavity 28. It can be appreciated that the tube 20 may be constructed into various different shapes. The tube 20 is preferably constructed of a copper material or variation of copper material.

As shown in FIGS. 1 through 3 of the drawings, a fuel member 30 is positioned within the lumen 22 of the tube 20. The fuel member 30 is preferably constructed of a rubber material or variation of rubber material commonly utilized within conventional garden hoses. The fuel member 30 is preferably tubular in shape, however it can be appreciated that various other shapes and designs may be utilized to construct the fuel member 30.

As shown in FIGS. 1 and 2 of the drawings, the tube 20 also includes a pair of opposing caps 24, 26. The first cap 24 is attachable to one end of the tube 20 and the second cap 26 is attachable to the opposing end of the tube 20 for enclosing the lumen 22 of the tube 20 thereby preventing the fuel member 30 from accidentally being removed. The caps 26, 28 may be constructed of a material that can be easily burned away from the tube 20 thereby opening the cavity 28 of the tube 20 such as paper or plastic.

In use, the user ignites a fire 14 within a campfire 14 or fireplace and positions the tube 20 with the fuel member 30 within onto the wood 12 within the fire 14. The tube 20 constructed of copper is heated along with the cavity 28 and the fuel member 30 constructed of a plastic material. As the plastic material is heated, the plastic material begins to melt into a liquid that chemically reacts with the copper tube 20. The chemical reaction produces gases that are ignited into various colors that are emitted throughout the fire 14. The process continues until the fuel member 30 is exhausted where after the chemical reactions will decrease along with the various colors emitted.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fire enhancement system for creating a variety of colors within an existing fire, comprising:

a tube comprised of a copper material; and a fuel member positioned within said tube, wherein said fuel member is comprised of a tubular plastic material from a garden hose.

2. The fire enhancement system of claim 1, further including a first cap and a second cap attached to opposing ends of said tube.

3. The fire enhancement system of claim 2, wherein said first cap and said second cap are comprised of material that deteriorates when heated.

4. The fire enhancement system of claim 3, wherein said first cap and said second cap are comprised of a plastic material.

5. A method of providing a fire enhancement system for creating a variety of colors within a fire, comprising the steps of:

(a) providing a fire;

(b) providing a fire enhancing tube, wherein said fire enhancing tube is comprised of a copper tube with a rubber tube positioned within an interior of said copper tube; and (c) positioning said fire enhancing tube within said fire, wherein said rubber tube melts within said copper tube causing a chemical reaction between said rubber tube and said copper tube producing gases which burn with different colors within said fire.

6. A fire enhancement system for creating a variety of colors within an existing fire, comprising:

a tube comprised of a copper material; and a fuel member positioned within said tube, wherein said fuel member is comprised of a tubular rubber material.

* * * * *